US008495037B1

(12) United States Patent
Westenberg (10) Patent No.: US 8,495,037 B1
(45) Date of Patent: Jul. 23, 2013

(54) EFFICIENT ISOLATION OF BACKUP VERSIONS OF DATA OBJECTS AFFECTED BY MALICIOUS SOFTWARE

(75) Inventor: Guido Westenberg, Columbia Heights, MN (US)

(73) Assignee: Symantec Operating Corporation, Mountain View, CA (US)

( * ) Notice: Subject to any disclaimer, the term of this patent is extended or adjusted under 35 U.S.C. 154(b) by 1709 days.

(21) Appl. No.: 11/359,202

(22) Filed: Feb. 21, 2006

(51) Int. Cl.
*G06F 7/00* (2006.01)
*G06F 17/00* (2006.01)

(52) U.S. Cl.
USPC .......................................... 707/698; 711/162

(58) Field of Classification Search
None
See application file for complete search history.

(56) References Cited

U.S. PATENT DOCUMENTS

| | | | | |
|---|---|---|---|---|
| 5,349,655 | A * | 9/1994 | Mann | 714/6 |
| 6,584,583 | B2 * | 6/2003 | Nam | 714/42 |
| 6,611,850 | B1 * | 8/2003 | Shen | 707/204 |
| 6,871,271 | B2 * | 3/2005 | Ohran et al. | 711/162 |
| 7,093,134 | B1 * | 8/2006 | Gong | 713/180 |
| 7,917,481 | B1 * | 3/2011 | Kale et al. | 707/693 |
| 2002/0078397 | A1 * | 6/2002 | Qin | 714/13 |
| 2002/0145050 | A1 * | 10/2002 | Jayaratne | 235/492 |
| 2002/0178374 | A1 * | 11/2002 | Swimmer et al. | 713/200 |
| 2004/0073617 | A1 * | 4/2004 | Milliken et al. | 709/206 |
| 2005/0262174 | A1 * | 11/2005 | Lohn et al. | 707/204 |
| 2006/0137010 | A1 * | 6/2006 | Kramer et al. | 726/22 |
| 2006/0149997 | A1 * | 7/2006 | Chai et al. | 714/6 |
| 2006/0242211 | A1 * | 10/2006 | Becker et al. | 707/204 |
| 2006/0265434 | A1 * | 11/2006 | Kathuria et al. | 707/204 |

OTHER PUBLICATIONS

"Veritas Backup Exec (tm) virus protection file for Dec. 2004 Update 1 (released Dec. 4, 2004)"; Data Sheet; Internet; Symantec Corporation; Dec. 9, 2004; http://seer.entsupport.symantec.com/docs/273550.htm.
"NovaBACKUP Backup Software—Now with Disaster Recovery and Built-In Open File Backup"; Data Sheet; 2006; Internet; NovaStor Corporation.
"Trend Micro IS Quarantine Backup Folder"; Forum Posting; Internet; Whirlpool Broadband Multimedia; Sep. 14, 2005; http://forums.whirlpool.net.au/forum-replies.cfm?t=397900.
"Removing Files From Quarantine and Backup"; Tutorial; Internet; Date Unknown; http://www.sd391.k12.id.us/compserv/tutorials/symantec1.htm.
"Preventing Virus caused Data Loss"; Data Sheet; Internet; Iomega Corporation; 2005; http://www.iomegadatarecovery.com/prevention-virus-protection.html.
"How to Disable System Restore in Windows ME or Windows XP"; Data Sheet; Internet; PC Hell; Date Unknown; http://www.pchell.com/virus/systemrestore.shtml.

(Continued)

*Primary Examiner* — Augustine K Obisesan
(74) *Attorney, Agent, or Firm* — Meyertons, Hood, Kivlin, Kowert & Goetzel, P.C.

(57) ABSTRACT

A system for efficient isolation of backup versions of data objects affected by malicious software includes one or more processors and a memory coupled to the processors. The memory comprises program instructions executable by the processors to implement a backup manager configured to receive an indication that a data object is infected by malicious software. In response to the indication, the backup manager is configured to identify a particular backup version of the data object to be excluded from a data set to be used for a restore operation.

22 Claims, 7 Drawing Sheets

OTHER PUBLICATIONS

"Personal Firewall Software Reviews 2006: BullGuard Reviewer's Comments"; Review; 2005; Internet; TopTenReviews, Inc.; http://personal-firewall-software-review.toptenreviews.com/bullguard-review.html.

"Cannot repair, quarantine, or delete a virus found in the _RESTORE or System volume information folder"; User Guide; Nov. 3, 2005; Internet; Symantec Corporation; http://service1.symantec.com/SUPPORT/nav.nsf/pfdocs/20000925135151206?Open.

"How to uninstall Norton AntiVirus 2001 manually when installed under Windows 95/98/Me"; User Guide; Jan. 15, 2004; Internet; Symantec Corporation; http://service1.symantec.com/SUPPORT/sunset-c2001kb.nsf/pfdocs/20000790460059265?Open.

* cited by examiner

EFFICIENT ISOLATION OF BACKUP VERSIONS OF DATA OBJECTS AFFECTED BY MALICIOUS SOFTWARE

BACKGROUND OF THE INVENTION

1. Field of the Invention

This invention relates to computer systems and, more particularly, to secure backup and restore techniques used in computer systems.

2. Description of the Related Art

Security of information technology (IT) assets is an ever-growing concern in today's enterprises. As more and more of enterprise computing resources are linked directly and/or indirectly to external networks such as the Internet, the likelihood of various types of network intrusions and infections by malicious software such as viruses, Trojan horses, worms, etc. is only expected to increase. Although a number of different techniques to enhance the security of enterprise computing environments have been implemented over the years, such as various types of hardware and software firewalls, virus detection tools, and the like, malicious-software attacks continue to succeed at least temporarily from time to time, often resulting in large productivity losses and/or data loss. For example, even though virus detection tools are frequently updated to recognize the latest viruses that have been identified, new, as-yet-undetected viruses are just as quickly being transmitted around the Internet by unsuspecting e-mail users, file sharers and other users. By the time a solution for a particular virus is developed and widely deployed, it is often the case that the virus has already infected hundreds or even thousands of systems around the world.

In some scenarios, for example where the computer systems at a particular enterprise are regularly backed up, an infected version of a particular file or other data object may be inadvertently backed up. At the time the backup version of the file is created, for example during a daily scheduled backup, the existence of the virus may not have been detected. The fact that the file is infected may not be detected even if a full virus scan of the data set being backed up is performed, since the virus detection tool used may not have been updated to recognize the virus.

For reasons such as those described above, it is often possible that by the time a live or online version of a particular file is found to be infected by malicious software, an infected backup version of the file may already have been created. The live version of the file may be quarantined and/or deleted when it is found to be infected, which may require a restoration of the file from a backup version. However, if the restore operation happens to use an infected backup version, the malicious-software infection may be reintroduced into the live data of the IT environment.

SUMMARY

Various embodiments of systems and methods for efficient isolation of backup versions of data objects affected by malicious software are disclosed. According to one embodiment, a system includes one or more processors and a memory coupled to the processors. The memory comprises program instructions executable by the processors to implement a backup manager configured to receive an indication that a data object (e.g., a "live" or "online" data object that is accessible to users and applications without requiring interaction with the backup manager) is infected by malicious software. In response to the indication, the backup manager is configured to identify a particular backup version of the data object to be excluded from a data set to be used for a restore operation. For example, in one embodiment where multiple backup versions of a given data object may have been created over time, the backup manager may be configured to perform an analysis to determine whether any of the backup versions are also infected, or are highly likely to be infected (e.g., if a backup version was created after the data object was last modified, the backup version may be inferred to be infected). If a backup version is found to be suspect (i.e., if it is determined that the backup version is infected or has a high probability of being infected), in one embodiment the backup manager may be configured to generate metadata (e.g., metadata stored in a backup catalog) indicating that the backup version is not to be used for restores.

In some embodiments, in response to the indication that a data object is infected by malicious software, the backup manager may be configured to determine whether a backup version differs from the infected data object using an efficient difference analysis, without for example actually scanning the backup version for malicious software, and to use the results of the analysis to determine whether to prevent restores from the backup version. For example, the backup manager may be configured to compare values of one or more attributes (such as last modification times, file sizes, etc.,) of the infected object with the values of corresponding attributes of the backup version; if the attribute values are identical, the backup manager may infer that the backup version is highly likely to be infected by the same malicious software and may exclude the backup version from restores. In other embodiments, the difference analysis may include a comparison of respective checksums and/or signatures generated from the backup version and the infected data object, and if the checksums or signatures for a backup version and the infected data object are identical, the backup version may be excluded from restore data sets.

A number of different techniques may be used to provide the indication to the backup manager that a data object is infected by malicious software in different embodiments. For example, in one embodiment, the indication may be sent by a malicious-software detector directly to the backup manager, e.g., using a notification application programming interface (API) supported by the backup manager, when the infection is detected. In another embodiment, the backup manager may be configured to directly or indirectly query a malicious-software detector to identify infected objects, e.g., by inspecting a list of infected data objects that have been quarantined by the malicious-software detector, or by using an API supported by the malicious-software detector. In some embodiments, the indication that a data object is infected may include return values or error codes received by the backup manager in response to I/O requests. In one such embodiment, for example, in response to receiving a generic error code (e.g., an error code that does not specifically indicate that a malicious software infection has been detected) in response to an I/O request, the backup manager may be configured to perform additional operations to determine additional information such as a specific source or cause of the error, and a result of the additional operations may indicate that the data object and one or more backup versions of the data object are infected. In another embodiment, specific error codes that indicate infection by malicious software may be returned. The return values and/or error codes may be provided to the backup manager in response to read requests and/or write requests or in various embodiments. For example, in one embodiment an error code may be returned when the backup manager attempts to read an infected data object to create a backup version, and in another embodiment, an error code may be returned when the backup manager attempts to write a copy of an existing backup version of a data object into a live data set during a restore.

In some embodiments, during restore operations for data objects that have been infected by malicious software, the backup manager may be configured to automatically search for uninfected backup versions from which the data objects should be restored. Users may be notified when a suspect or infected backup version of a data object is encountered during a restore operation in one embodiment, and permission to search for and restore from an uninfected version may be requested from the users.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 1:
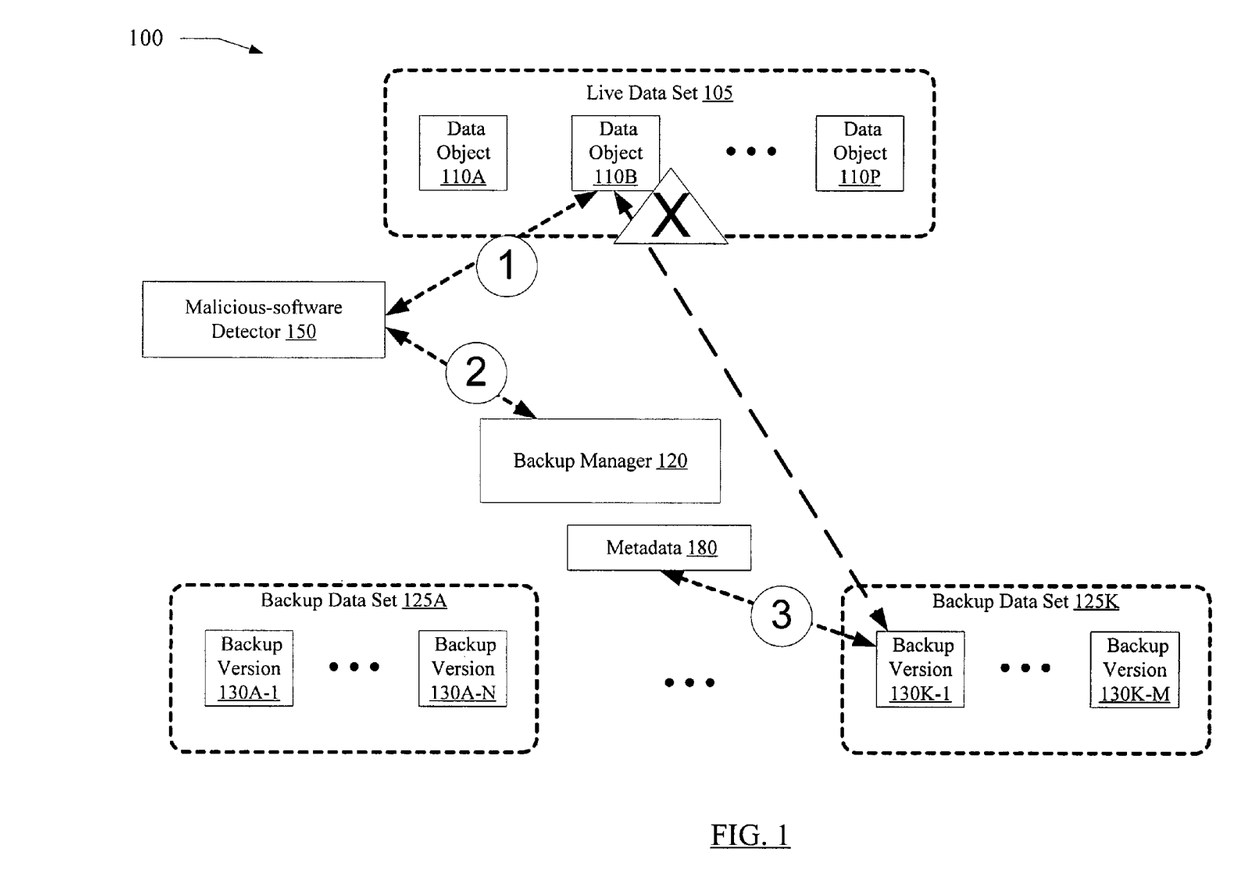
FIG. 1 is a block diagram illustrating one embodiment of a system.

FIG. 1 is a block diagram illustrating a system 100 according to one embodiment. As shown, system 100 includes a backup manager 120, a live data set 105 and a plurality of backup data sets 125 (e.g., backup data sets 125A-125K). Backup manager 120 may be responsible for generating backup versions of data objects (such as objects 110A-110P, collectively referred to herein as data objects 110) of the live data set 105 using any of a variety of backup techniques. In addition, backup manager 120 may also be configured for restoring backed up versions of data objects (such as backup versions 130A-1-130A-N, 130K-1-130K-M, collectively referred to herein as backup versions 130) to the live data set 105 as needed, using any of a variety of restoration techniques. The terms "live data set" and "online data set", as used herein, refer to a collection of data objects 110 that are directly accessible to users and applications for read and modify operations, e.g., without requiring interactions with the backup manager 120. In contrast to live or online data, backup data sets 125 comprise versions of data objects that may generally require restoration by the backup manager 120 before they can be read or written by users or applications—thus, backup manager 120 generally serves as an intermediary for access to backup versions 130. Data objects 110 may comprise any of a variety of different virtual and/or physical storage objects in various embodiments, such as files, directories, logical volumes, objects of an object-based storage device (OBSD), database management system (DBMS) objects such as records, tables, indexes, etc.

At a given point in time, one or more data objects 110 of the live data set 105 may include updates that have not been yet been backed up. Each backup data set 125 may include respective versions of one or more objects of the live data set 105, e.g., corresponding to the current state of the live data set 105 at the time the backup data set was created by backup manager 120. Not all backup data sets 125 may include backup versions 130 corresponding to each of the data objects 110 currently present in live data set 105. In addition, backup versions 130 in different backup sets may correspond to the same data object 110: e.g., if a particular data object 110A is updated on a Monday and then on a Tuesday of a particular week, and backups of the live data set are created every night, one backup version 130A-1 of the data object 110A may be created and stored in a backup data set 125A on Monday night, and another backup version 130B-1 (not shown in FIG. 1) may be created and stored in a backup data set 125B (also not shown in FIG. 1) created on Tuesday night.

In response to a restore operation requested for one or more data objects 110, e.g., in the event that the live versions of the data objects are lost, damaged or corrupted, backup manager 120 may be configured to identify a set of backup versions 130 from which the data objects are to be restored, and restore the data objects using the identified set of backup versions. The set of backup versions 130 from which the data objects are restored may be referred to herein, as a "restore data set" or a "data set used for the restore operation". It is noted that the set of backup versions 130 included in a restore data set may not all have been created by the backup manager in a single backup operation, and that backup versions from two or more different backup data sets 125 may be used for a single restore operation. The backup manager 120 may maintain configuration information (e.g., information indicating which backup versions 130 correspond to a given data object 110, etc.) in a backup catalog or backup database in some embodiments.

The backup manager 120 may be configured to receive indications that one or more data objects 110 have been infected by malicious software, such as a virus, Trojan horse, worm, spyware, adware, etc., from a variety of sources in different embodiments.

The term "malicious software", as used herein, refers generally to any software that is intended to damage or disrupt the ability of a computer system to perform functions desired by the owners or managers of the computer system, software that is intended to utilize resources of the computer system in a manner that is not desired by the owners or managers, and/or software intended to obtain information from the computer system without the consent of the owners or managers. In the depicted embodiment, a malicious-software detector 150 may be configured to detect whether one or more data objects 110 in the live data set 105 are infected by malicious software, and provide an indication to anyone who reads the data objects—including the backup manager 120—if an infection is detected. In response to receiving the indication, the backup manager 120 may be configured to determine whether one or more backup versions 130 of the infected data object 110 are to be excluded from data sets to be used for restore operations. In some embodiments, the backup manager 120 may be configured to perform analysis on selected backup versions 130 to determine which, if any, of the backup versions 130 are to be excluded from restores, as described below in further detail.

FIG. 1 illustrates an exemplary scenario in which malicious-software detector 150 has identified data object 110B as being infected, as indicated by the arrow labeled "1" and the large "X" indicating an infection. The malicious-software detection tool 150 may be configured to perform any combination of a variety of actions in response to detecting the infection in various embodiments, such as repairing, "quarantining" and/or deleting the infected data object 110B, notifying a user or administrator of the detection of the infection, etc. In addition, in the depicted embodiment, the malicious-software detector 150 may be configured to send an indication to the backup manager 120, as indicated by the arrow labeled "2", that the data object 110B is infected. In some embodiments, the indication may be sent in the form of a message by the malicious-software detection tool 150 to the backup manager 120, e.g. using a vendor-neutral notification application programming interface or API supported by the backup manager 120, identifying the infected object 110B as soon as the infection is detected. In other embodiments, the indication may be received by the backup manager via other methods: for example, the backup manager 120 may be configured to periodically examine a list of quarantined data objects generated by malicious-software detector 150, send queries to malicious-software detector 150, or examine a database maintained by malicious-software detector 150. In one embodiment, an indication of infection of a data object may be provided to backup manager 120 via a return value of an I/O operation requested by the backup manager 120 when and if backup manager 120 accesses a potentially infected backup version 130, as described below in further detail. In response to the indication, in the exemplary scenario of FIG. 1, the backup manager 120 may be configured to exclude backup version 130K-1 from a restore data set. As indicated by the arrow labeled "3", the backup manager 120 may be configured to generate metadata 180 indicating, for example, that the backup version 130K-1 is a "suspect" or "infected" version of the data object 110B, and should therefore not be used for restores. In some embodiments, the metadata 180 may be stored in a backup catalog maintained by the backup manager to manage backup data sets 125.

Backup manager 120 may thus be able to efficiently identify those specific backup versions 130 that, if used for restore operations, may result in malicious-software infections being reintroduced into the live data set 105, and thus prevent such potentially damaging restore operations. Furthermore, the security of restore operations may be enhanced using the techniques described above without requiring malicious-software scans specifically for backup operations, e.g., without scanning the set of data objects 110 that are to be included in a backup data set 125 or the backup versions 130 after they have been generated. In addition, the operations of the backup manager 120 may be performed in some embodiments in a vendor-neutral manner with respect to the malicious-software detector 150; that is, any malicious-software detection tool or mechanism may be employed, without requiring an IT administrator to purchase or license a specific malicious-software detection tool 150. Since many IT environments often have pre-deployed malicious-software detection tools, a technique such as the one described above that avoids tight coupling of backup manager 120 to a specific vendor or supplier of malicious-software detection technology may help to reduce overall product licensing costs.

Figure 2:
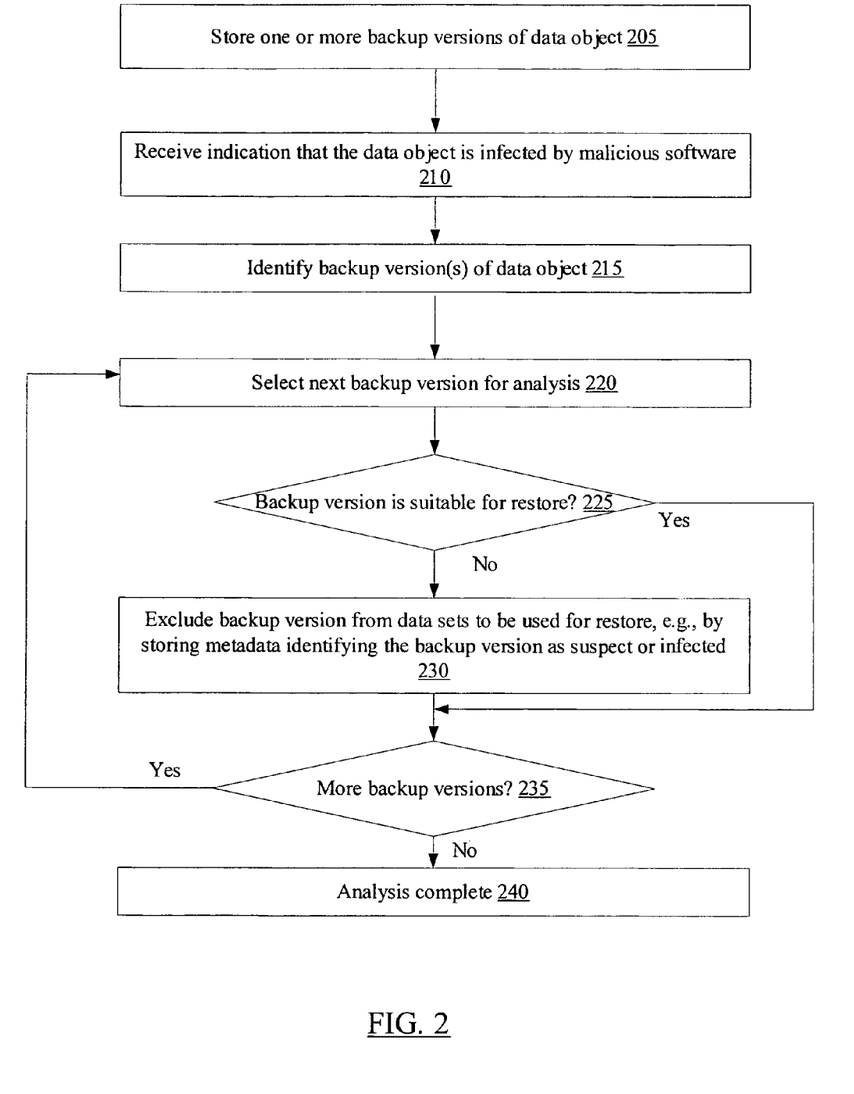
FIG. 2 is a flow diagram illustrating aspects of the operation of a backup manager, according to one embodiment.

FIG. 2 is a flow diagram illustrating aspects of the operation of backup manager 120, according to one embodiment. The backup manager may be configured to generate and store one or more backup versions 130 of one or more data objects 110 (block 205) using any desired backup technique. The backup versions 130 may be generated and stored, for example, according to a backup schedule set up by a user or administrator, in which full and/or incremental backups of a portion or all of live data set 105 are created at specified time intervals. Not all the data blocks present in a given data object 110 may be copied to create a given backup version 130 in some embodiment: e.g., to perform an incremental backup, in one embodiment only the portions of the data object that have changed since a previous backup may actually be copied, along with enough information to allow the full restoration of the data object 110 from the incremental backup version and one or more other backup versions. The backup versions 130 may in some embodiments be stored in different storage devices than those used for the live data set 105, e.g., in a different physical location or on removable media, for disaster recovery purposes.

The backup manager may receive an indication that a data object 110 for which backup versions may have been created earlier is infected by malicious software (block 210). In some embodiments, the indication may be sent by a malicious-software detection tool 150 as soon as the infection is discovered. In other embodiments, there may be a delay between the detection of the infection and the indication being provided to the backup manager 120: for example, the backup manager 120 may be, configured to periodically inspect a list of infected objects (e.g., objects quarantined by a virus detector tool) to identify data objects 110 that have been infected, or the indication may be provided to the backup manager 120 in a return value from a read or write request from the backup manager 120 during a backup or restore operation.

In response to the indication, the backup manager 120 may be configured to identify one or more backup versions 130 of the infected data object 110 (block 215). For example, in response to an indication that a particular data object 110B has been infected, configuration information maintained by the backup manager 120 may allow it to generate a list of all the previously backed up versions 130 (e.g., including backup version 130K-1 in FIG. 1) of that data object 110B within various backup data sets 125 from which restores are still permitted. The set of backup versions 130 of the infected data object 110 may then be arranged or sorted in some order, e.g., in reverse chronological order based on the times at which they were created, in some embodiments for analysis. In other embodiments, the backup versions may be analyzed in the order in which they are found by the backup manager 120, without an additional sorting step. During a given iteration of the analysis, the backup manager 120 may select the next backup version 130 to be examined (block 220), and determine whether that backup version is suitable for restoration or not (block 225). A number of different techniques may be used to determine whether the backup version is suitable for restoration in various embodiments, as described below in further detail. In one embodiment, for example, one or more attributes of the backup version 130 (such as last modification time and/or object size) may be compared to corresponding attributes of the infected data object 110 to make a determination whether the backup version differs from the infected version, and the backup version may be excluded from restore operations if the attributes are identical.

If the backup version 130 being analyzed is found to be unsuitable for restores, the backup manager may mark it as such, e.g., by generating metadata 180 that indicates that the backup version is suspect or infected and is not to be restored (block 230) and storing the metadata in a backup database or backup catalog. The backup manager 120 may be configured to implement a "backup quarantine" technique to mark the suspect or infected backup versions in some embodiments, analogous to the quarantine techniques used by malicious-software detectors such as virus scanners. In some embodiments, the suspect or infected backup version (i.e., the backup version found unsuitable for restores) may be logically and/or physically removed from the corresponding backup data set 125, or moved to a special location designated for quarantined backup versions. If more backup versions of the infected data object remain to be analyzed (as detected in block 235), the operations corresponding to blocks 220, 225 and 230 may be repeated until all backup versions that could potentially have been used for restoration have been analyzed and the analysis is complete (block 240).

It is noted that in some embodiments, the operations of the backup manager 120 in response to the indication of an infection may vary in some respects from those illustrated in FIG. 2, or may be performed in a different order than the order shown. In one embodiment where the analysis is performed in reverse chronological order, for example, as soon as a particular backup version 130 is found to differ from an infected data object (or from an infected backup version), further analysis of earlier versions may be abandoned. For example, in a scenario where three backup versions 130X, 130Y and 130Z of a data object 110 that has been found to be infected were created at respective times T, (T+a), and (T+a+b), the backup manager 120 may be configured to analyze 130Z before 130Y, and 130Y before 130X. If the analysis of backup version 130Z indicates that backup version 130Z differs from an infected version, analysis of backup versions 130Y and 130X (which were created earlier) may not be required, based on an inference by the backup manager 120 that versions 130Y and 130X must also differ from the infected version. In another embodiment, backup manager 120 may be configured to use multiple threads of execution to perform the analysis, so that one or more backup versions 130 may be analyzed concurrently instead of being analyzed one by one. In one implementation, instead of immediately analyzing the backup versions 130, backup manager 120 may be configured to mark all the backup versions 130 of an infected data object 110 as being "suspect", and the analysis may be performed asynchronously with respect to the indication that the data object 110 is infected. For example, in one implementation all backup versions of an infected data object 110 may be placed on a "to-be-analyzed" queue when the backup manager 120 receives the indication of the infection, and the backup manager 120 may be configured to examine, as a background task when no high-priority backups or restores are in progress, which if any of the backup versions on the "to-be-analyzed" queue are to be excluded from restores. As described below in further detail, in some embodiments "just-in-time" analysis of backup versions may be performed—e.g., the fact that a particular backup version of a data object is infected may be determined during restore operations, and if such an infection is found, the particular backup version (and/or any other infected backup versions of the data object) may be excluded from the restore.

Figure 3:
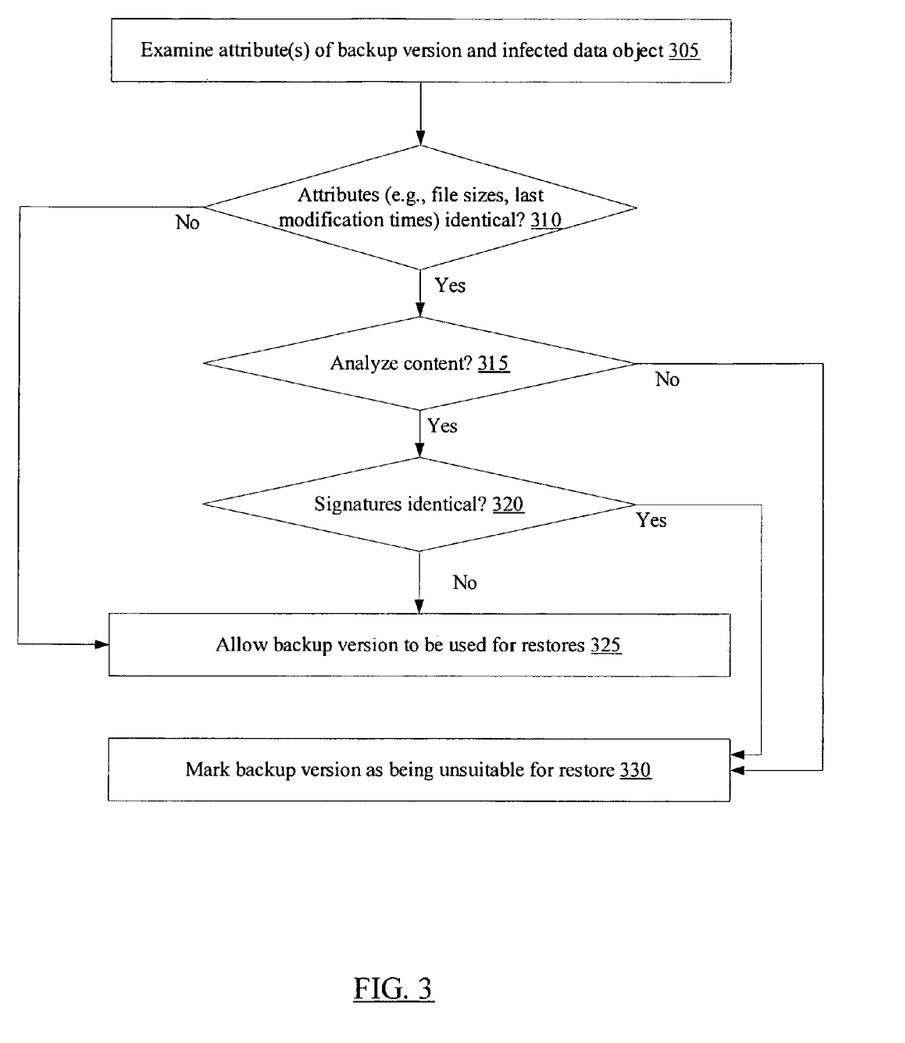
FIG. 3 is a flow diagram illustrating aspects of the operation of a backup manager during analysis to determine whether a particular backup version of an infected data object should be excluded from restore data sets, according to one embodiment.

FIG. 3 is a flow diagram illustrating aspects of the operation of a backup manager 120 during analysis to determine whether a particular backup version 130 of an infected data object 110 should be excluded from restore data sets, according to one embodiment. The results of operations such as those illustrated in FIG. 3 may be used in operations corresponding to block 225 and 230 of FIG. 2. In the embodiment of FIG. 3, the backup manager 120 may be configured to compare the backup version 130 with the infected data object 110 using one or more difference criteria, and use the results of the comparison to infer whether the backup version is either actually infected, or at least highly likely to be infected. The analysis may begin by the backup manager examining one or more attributes of the backup version 130 as well as the infected data object 110 (block 305) to determine whether corresponding attribute values are identical. Exemplary attributes that may be examined in an embodiment where each data object 110 represents a file may include, for example, file size in bytes, last modification time, an identification of the last user to modify the file, ownership information, read/write permissions, etc. Similar attributes may be examined for other types of data objects 110, such as object size, object modification time, etc., in object-based storage devices (OBSD), database record sizes and modification times in databases, and so on. If the attribute values for the backup version 130 and the infected data object are found to be identical (as detected in block 310), the backup manager 120 may infer that the probability that the backup version 130 is also infected by the same malicious software is high. Conversely, if the attribute values differ, the backup manager 120 may infer that the probability that the backup version is infected is low. If the attribute values differ, the backup manager may, e.g., depending on the differences found in the attributes, either allow the backup version 130 to be used for restore operations (block 325), or in some embodiments may mark the backup version 130 as potentially requiring further analysis. For example, if the size or last modification time of the backup version 130 differs from that of the infected data object 110, the backup manager 120 may determine that the backup version is not infected and safe to use for restore in some embodiments; however, if the backup version 130 differs from the infected data object 110 only in other attributes (such as ownership or access permissions), further analysis may be performed.

In the depicted embodiment, if the attribute values are identical, the backup manager 120 may be configurable to perform an additional check, based on the actual contents of the data object 110 and the backup version 130, to determine whether the backup version should be excluded from restore operations. If such content-based checking is to be performed (as determined in block 315), the backup manager may be configured to compare a signature (e.g., a result of a mathematical function on the bytes of the object) of the data object 110 with the signature of the backup version 130. If the signature is identical (as determined in block 320 of FIG. 3), the backup version 130 may be inferred to have a very high probability of being infected (block 330) and may therefore be excluded from restore data sets. Similarly, if the attribute values are identical and the backup manager is not configured to perform additional content-based analysis (as also determined in block 315), the backup version 130 may be excluded from restore operations. Any of a variety of different signature generation schemes, such as various types of checksums or the MD5 algorithm, may be employed in different embodiments. In some embodiments, the backup manager 120 may be configured to generate the signatures for the backup versions 130 and/or the data objects 110 on demand, i.e., when needed for the analysis illustrated in FIG. 3; in other embodiments, the backup manager 120 may be configured to generate and store signatures in advance for at least some backup versions 130 in preparation for possible difference analysis.

In some embodiments, content-based techniques such as checksums/signatures may be used without using attribute-based techniques.

By using attribute-based analysis and/or signature-based analysis as described above, in some embodiments the amount of processing required to determine whether the backup version should or should not be used for restore may be reduced, e.g., compared to the analysis and processing that may be required to scan the backup version. In some embodiments, the backup manager 120 may allow users to specify which specific techniques should be used to analyze the backup versions 130—e.g., an administrator may use a configuration parameter to indicate a particular signature/checksum algorithm is to be used. In one embodiment, different analysis algorithms may be specified for different subsets of the live data set 105—e.g., an administrator may specify that for any infected files in a directory D1, a checksum-based analysis is required, while for files in a directory D2, an attribute-based analysis is sufficient. In one implementation, the analysis of a backup version 130 may be performed by invoking a malicious-software detector 150; e.g., instead of or in addition to relying on attribute analysis or signature analysis, an actual scan of the backup version 130 of the infected data object 110 may be performed.

Figure 4:
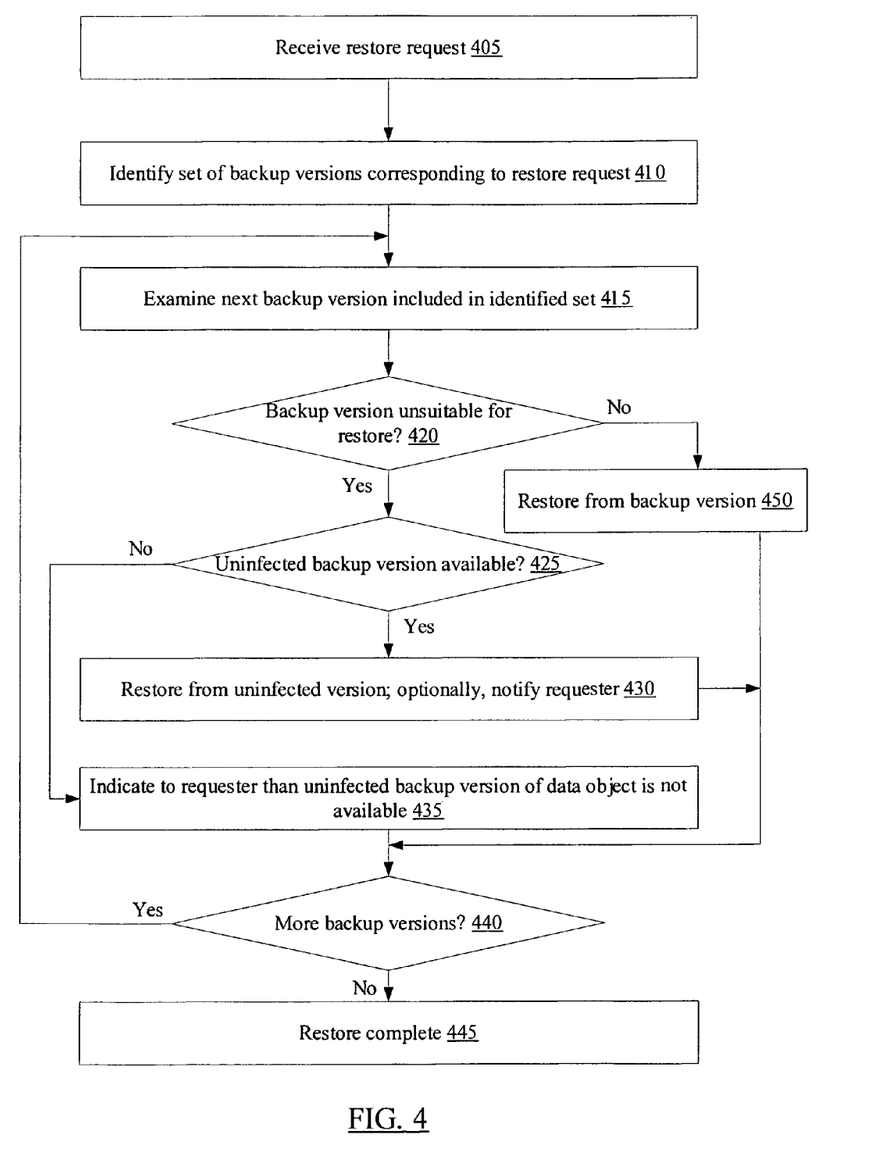
FIG. 4 is a flow diagram illustrating aspects of the operation of a backup manager configured to identify an uninfected backup version for a particular data object to be restored, according to one embodiment.

In some embodiments, in response to a restore request, the backup manager 120 may be configured to identify a suitable uninfected backup version 130 for a particular data object to be restored. FIG. 4 is a flow diagram illustrating aspects of the operation of a backup manager 120 during a restore operation in one such embodiment. The backup manager may receive a restore request (block 405) and identify a set of backup versions corresponding to the data objects 110 to be restored (block 410). For example, the restore request may indicate that all the files in a particular directory or file system are to be restored using the latest available backup versions, and the backup manager may assemble a list of the latest backup versions 130 corresponding to the specified directory or file system. The backup manager 120 may then be configured to restore each of the data objects 110 for which an uninfected backup version is available. To perform the restoration, the backup manager 120 may be configured to examine each of the identified backup versions to determine whether it is suitable for restoration. In some embodiments, the backup manager 120 may have previously marked one or more of the backup versions 130 as being unsuitable for restoration, while in other embodiments the determination of whether a given backup version 130 should or should not be restored may be made after the restore request is received.

As shown in block 415, during iterative analysis of the set of backup versions 130 from which restoration may potentially be performed, the backup manager 120 may examine the next backup version. If the backup version 130 is found to be unsuitable for restoration (as detected in block 420), e.g., if it was previously marked as being suspect or infected, or if a return value for an I/O operation on the backup version indicates that it corresponds to an infected data object 110, the backup manager 120 may be configured to search for an uninfected backup version 130 for the corresponding data object 110. If an uninfected backup version is found (e.g., in a different backup data set 125 than the one that contained the suspect or infected backup version), as detected in block 425, the backup manager 120 may be configured to restore the data object from the uninfected backup version (block 430). In some embodiments, the backup manager 120 may optionally inform the requester (e.g., the user or application that requested the restore) that an infected backup version was excluded from the restore and a different backup version, which may have been backed up at an earlier point in time than the infected backup version, was used for the restore.

In one embodiment, if the backup manager 120 finds that the backup version 130 being examined is infected or suspect, the backup manager 120 may be configured to obtain explicit permission from the requester before restoring a different backup version: e.g., a requesting user may be prompted for permission using a message such as "Backup version of file C:\xyz\a.txt dated Jan. 5, 2006 is suspected to be infected by a virus. If restore from a backup version dated Jan. 4, 2006 is acceptable, please click on the "Use latest uninfected version" button." In some embodiments, the backup manager 120 may be configured to provide a configuration parameter (set, e.g., using a graphical interface, a parameter file, an environment variable or a command line option) allowing users to indicate that the backup manager is permitted to restore from the latest available uninfected backup version without asking for explicit permission when an infected or suspect backup version is found.

If no "clean" backup version 130 (i.e., a version that is not infected and not suspected of being infected) is available for a given data object 110 (as also detected in block 425), the backup manager 120 may be configured to notify the requesting user or application that no restorable backup version is available (block 435). If the backup version being examined is found to be suitable for restore in operations corresponding to block 420, the corresponding data object 110 may be restored from the backup version (block 450). If additional backup versions of the identified set of backup versions remain (as detected in block 440), the operations corresponding to blocks 415, 420, 425, 430, 435 and/or 450 may be repeated until the entire set of backup versions corresponding to the restore request have been examined and the restore operation is completed (block 445).

Figure 5A:
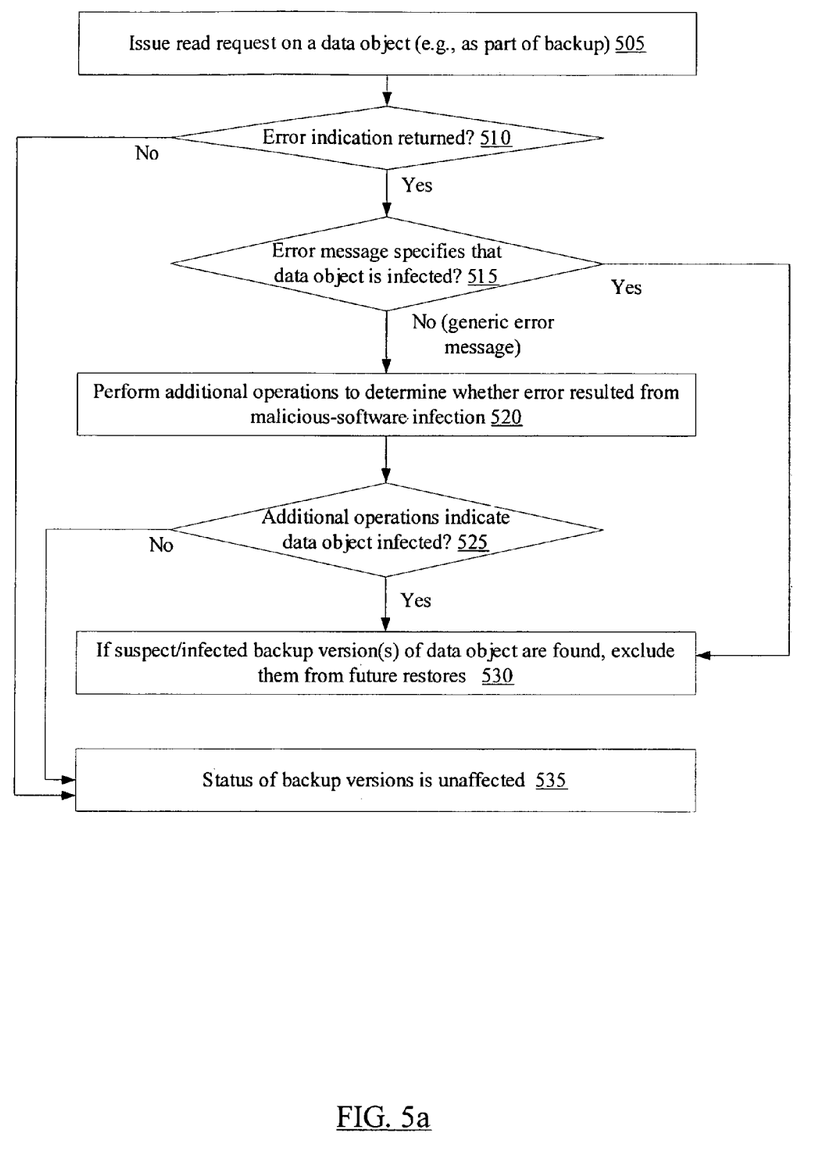
FIG. 5a is a flow diagram illustrating aspects of the operation of a backup manager in an embodiment where error codes returned from read operations may indicate infection by malicious software.
Figure 5B:
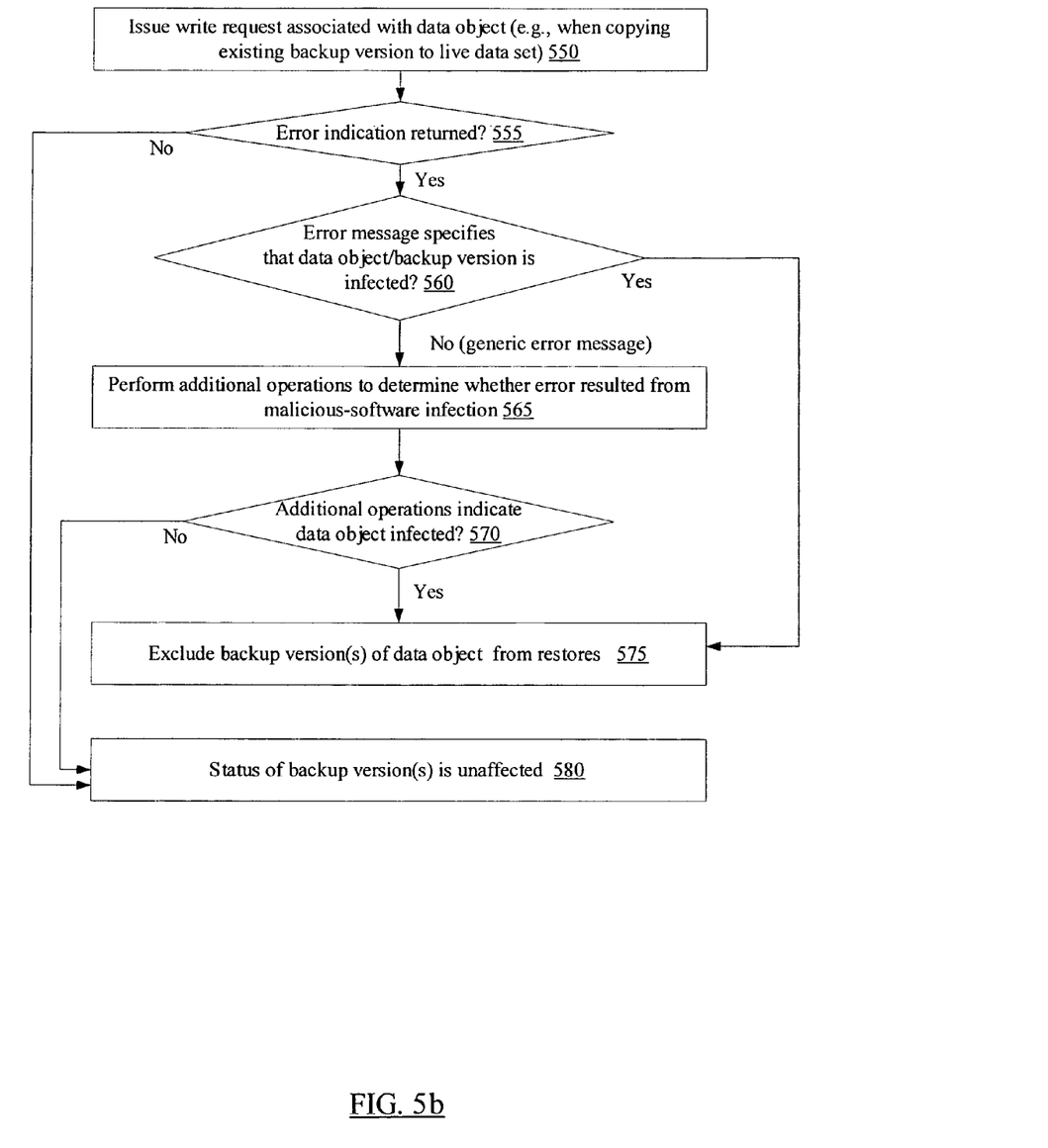
FIG. 5b is a flow diagram illustrating aspects of the operation of a backup manager in an embodiment in which error codes returned from write operations may indicate infection by malicious software.

In some embodiments, the indication that a given data object 110 or one of its backup versions 130 is infected may be provided to the backup manager in the form of return values or error codes when the backup manager attempts I/O operations associated with the data object. FIG. 5a is a flow diagram illustrating aspects of the operation of a backup manager 120 in an embodiment where error codes from read operations may indicate infection by malicious software, and FIG. 5b is a flow diagram illustrating aspects of the operation of a backup manager 120 in an embodiment in which error codes from write operations may indicate infection by malicious software. As shown in block 505 of FIG. 5a, the backup manager 120 may be configured to issue a read request (e.g., a read system call) on a particular data object 110, e.g., as part of a requested backup. If the read request succeeds without an error (i.e., if no error code is returned, as detected in block 510), the status of backup versions of the data object 110 is unaffected (block 535). If the read request results in an error indication (as also detected in block 510), however, the backup manager 120 may be configured to perform additional operations that may affect the status of backup versions of the data object 110. In some embodiments, specific error messages that clearly indicate that the data object is infected may be provided: e.g., an error code such as "VIRUS_INFECTION_READ_ERROR" may immediately indicate to the backup manager that the data object 110 is infected. If the error code specifies that the data object 110 is infected (as detected in block 515), the backup manager may be configured to exclude any suspect or infected backup versions 130 of the data object 110 from restores (block 530): e.g., in some embodiments the backup manager may use the difference analysis techniques described earlier in conjunction with FIG. 3 to identify suspect or infected backup versions. In some embodiments, however, a more generic error code (e.g., "ACCESS_DENIED" or simply "READ_ERROR") may be returned, which does not specifically indicate that the data object is infected by malicious-software. If a generic error code is received (as also detected in block 515), the backup manager 120 may be configured to perform one or more additional operations (block 520) to determine to determine whether malicious-software infection caused the error, or more generally to identify the cause or source of the error. If a result of the additional operations indicates that the data object is indeed infected (as determined in block 525), the backup manager 120 may also exclude suspect/infected backup versions of the data object from restores (block 530). If the additional operations do not indicate that the data object 110 is infected, the status of backup versions of the data object may be left unchanged (block 535). A variety of different additional operations corresponding to block 520 may be performed by the backup manager 120 in various embodiments when a generic error message is received: for example, the backup manager 120 may inspect a set of data objects 110 known to have been quarantined in one embodiment, or the backup manager may query a malicious-software detector 150 using an API supported by the malicious-software detector to determine whether the data object 110 on which the read is requested is infected.

FIG. 5*b* illustrates analogous operations to those illustrated in FIG. 5*a* for an embodiment in which the return values indicating possible infection are received in response to write requests. The backup manager 120 may issue a write request, e.g., when it attempts to copy a backup version 130 of a data object 110 into the online data set 105 for restore (block 550 of FIG. 5*b*). If the write succeeds, the status of backup versions of the data object 110 may be unaffected by the write (block 580). If the write request results in an error code (as detected in block 555), however, the backup manager 120 may be configured to determine whether one or more backup versions 130 of the data object (including the one being copied) are infected or suspect. As in the case of read operations of FIG. 5*a*, an error code for the write may be either specific (e.g., a "VIRUS_INFECTION_WRITE_ERROR" error code may be returned to the backup manager, clearly indicating that the data object 110 is infected) or generic (e.g., "ACCESS_DENIED" or "WRITE_ERROR"). If a specific error code indicating malicious-software infection is received (as detected in block 560), one or more backup versions 130, including the backup version being copied, may be excluded from restores (block 575). If the error code is generic or unrecognized by the backup manager (as also detected in block 560), additional operations similar to those described above with respect to block 520 of FIG. 5*a* may be performed to determine whether the backup version 130 being copied is infected or not (block 565 of FIG. 5*b*). If a result of the operations indicates that the backup version is infected (as detected in block 570), the infected backup version 130 (and any other backup versions that are also found to be infected, e.g., using difference analysis as described earlier) may be excluded from the restore. In some embodiments, as described earlier, the backup manager may be configured to search for uninfected backup versions of the data object 110 and perform the restore using an uninfected version if one is found. If the additional analysis indicates that the backup version 130 is not infected, the status of the backup version (and any other backup versions) may not be affected by the write operation (block 580). In some embodiments, a malicious-software detector 150 may be integrated with, or may be configured to cooperate with, an I/O subsystem (e.g., with a file system, a volume manager and/or an operating system) in order to provide the return codes for reads and/or writes as described above. In one embodiment, error codes indicating possible infection by malicious software may be returned for both read and write operations.

Figure 6:
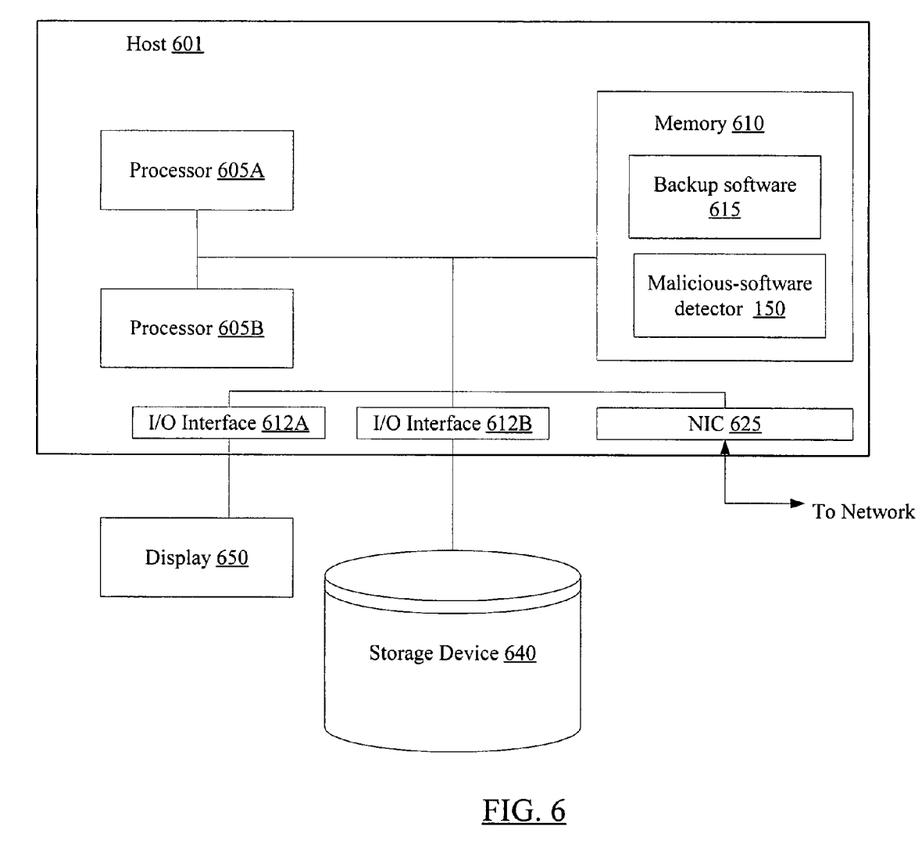
FIG. 6 is a block diagram of a computer host, according to one embodiment.

FIG. 6 is a block diagram of a computer host 601, according to one embodiment. As shown, host 601 may include one or more processors 605, such as processors 605A and 605B. In various embodiments, processors 605 may be implemented using any desired architecture or chip set, such as the SPARC™ architecture from Sun Microsystems or the x86-compatible architectures from Intel Corporation, Advanced Micro Devices, etc. Backup software 615 comprising program instructions that may be executable to implement the functionality of the backup manager 120 described above may be partly or fully resident within a memory 610 at a given point in time, and may also be stored on a storage device 640. Memory 610 may be implemented using any appropriate medium such as any of various types of RAM (e.g., DRAM, SDRAM, RDRAM, SRAM, etc.). In addition to processors 605 and memory 610, host 601 may also include one or more I/O interfaces 612, such as I/O interface 612A to a display device 650, and I/O interface 612B providing access to storage devices 640, one or more network interface cards (NICs) 625 providing access to a network, and the like. Any of a variety of storage devices 640 may be used to store the instructions as well as data for backup software 615 in different embodiments, including any desired type of persistent and/or volatile storage devices, such as individual disks, disk arrays, tape devices, optical devices such as CD-ROMs, CD-RW drives, DVD-ROMs, DVD-RW drives, flash memory devices, various types of RAM and the like. One or more storage devices 640 may be directly coupled to host 601 in some embodiments (e.g., using the Small Computer Systems Interface (SCSI) protocol), or may be accessible over any desired storage interconnect such as iSCSI (internet SCSI), a fiber channel fabric or storage area network (SAN) in other embodiments. A storage device 640 may include holographic media in some embodiments. Part or all of live data set 105 and/or backup data sets 125 may be stored on any desired type of storage device 640.

In addition to backup software 615, memory 610 and/or storage devices 640 may also store operating systems software and/or software for various applications, including malicious-software detector 150, in various embodiments. In some embodiments, backup software 615 may be included within an operating system, a storage management software product or another software package, while in other embodiments, backup software 615 may be packaged as a standalone product. In one embodiment, backup software 615 and malicious-software detector 150 may be combined into a single software package or product. In some embodiments, the component modules of backup software 615 may be distributed across multiple hosts 601, or may be replicated at a plurality of hosts. In one embodiment, part or all of the functionality of a backup manager 120 may be implemented via one or more hardware devices (e.g., via one or more Field Programmable Gate Array (FPGA) devices) or in firmware.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:
1. A system, comprising:
one or more processors; and memory coupled to the one or more processors, wherein the memory comprises program instructions executable by the one or more processors to implement a backup manager configured to:
- attempt an input/output (I/O) operation with a live version of a data object;
- receive an I/O error code in response to the attempted I/O operation, wherein the I/O error code indicates that the live version of the data object is infected by malicious software;
- after receiving the I/O error code, compare a signature of the live version of the data object with respective signatures of one or more backup versions of the data object to identify at least one backup version of the data object; and
- store metadata in a backup catalog, wherein the metadata indicates that the identified at least one backup version of the data object is to be excluded from use during a subsequent restoration of the data object.

2. The system as recited in claim 1, wherein the backup manager is further configured to:
- store one or more backup versions of the data object, including the identified at least one backup version, prior to receiving the I/O error code; and
- in response to the I/O error code, perform an analysis of the stored one or more backup versions to identify the at least one version.

3. The system as recited in claim 2, wherein to perform the analysis, the backup manager is further configured to:
- determine whether a given backup version of the stored one or more backup versions differs from the live version of the data object according to one or more difference criteria;
- if the backup version does not differ from the live version of the data object according to the one or more difference criteria, determine that the given backup version is to be excluded from the subsequent restoration of the data object; and
- if the backup version differs from the live version of the data object according to the one or more difference criteria, determine that the given backup version is not to be excluded from the subsequent restoration of the data object.

4. The system as recited in claim 3, wherein to determine whether the backup version differs from the live version of the data object, the backup manager is further configured to:
- compare values of one or more attributes of the backup version with corresponding values of one or more attributes of the live version of the data object.

5. The system as recited in claim 4, wherein the compared values include one or more of a file size, a file modification time, a last user of a file, file ownership information, file read/write permissions.

6. The system as recited in claim 4, wherein the compared values include one or more of a data object size, a data object modification time, a backup time of a data object.

7. The system as recited in claim 1, wherein the I/O error is a generic error indication, and wherein, in response to the generic error indication, the backup manager is configured to:
- perform one or more additional operations to determine a cause of the generic error indication, wherein a result of the one or more additional operations indicates that the live version of the data object is infected by the malicious software.

8. The system as recited in claim 1, wherein the I/O operation comprises at least one of (a) a request to write a copy of the backup version into the live data set and (b) a request to read the live version of the data object.

9. The system as recited in claim 1, wherein I/O error code comprises a notification from a malicious-software detection tool.

10. The system as recited in claim 1, wherein the backup manager is further configured to:
- in response to a restore request received after the I/O error code, identify a different backup version of the data object to be used to restore the live version of the data object, wherein the different backup version is not infected by the malicious software.

11. The system as recited in claim 1, wherein the data object is a file, a directory, a logical volume, an object of a object-based storage device (OBSD), or a database management system (DBMS) object.

12. The system of claim 1, wherein the I/O operation is a read operation or a write operation of the live version of the data object.

13. A computer-implemented method, comprising:
- attempting an input/output (I/O) operation with a live version of a data object;
- receiving an I/O error code in response to the attempted I/O operation, wherein the I/O error code indicates that the live version of the data object is infected by malicious software; after receiving the I/O error code, comparing a signature of the live version of the data object with respective signatures of one or more backup versions of the data object to identify at least one backup version of the data object; and
- store metadata in a backup catalog, wherein the metadata indicates that the identified at least one backup version of the data object is to be excluded from use during a subsequent restoration of the data object.

14. The method as recited in claim 13, further comprising:
- storing one or more backup versions of the data object, including the identified at least one backup version, prior to receiving the I/O error code; and
- in response to the I/O error code, performing an analysis of the stored one or more backup versions to identify the at least one backup version.

15. The method as recited in claim 14, wherein said performing the analysis comprises:
- determining whether a given backup version of the stored one or more backup versions differs from the live version of the data object according to one or more difference criteria;
- if the backup version does not differ from the live version of the data object according to the one or more difference criteria, determining that the given backup version is to be excluded from the subsequent restoration of the data object; and
- if the backup version differs from the live version of the data object according to the one or more difference criteria, determining that the given backup version is not to be excluded from the subsequent restoration of the data object.

16. The method as recited in claim 13, further comprising:
- in response to a restore request received after the I/O error code, identifying a different backup version of the data object to be used to restore the live version of the data object, wherein the different backup version is not infected by the malicious software.

17. The computer implemented method as recited in claim 13, wherein the data object is a file, a directory, a logical volume, an object of a object-based storage device (OBSD), or a database management system (DBMS) object.

18. A non-transitory computer-readable medium comprising program instructions, wherein the instructions are computer-executable to implement a backup manager configured to:
- receive an error code indicating that a live version of a data object is infected by malicious software;
- after receiving the error code, compare a signature of the live version of the data object with respective signatures of one or more backup versions of the data object to identify at least one backup version of the data object; and
- store an indication that the identified at least one backup version of the data object is to be excluded from use during a subsequent restoration of the data object.

19. The computer-readable medium as recited in claim 18, wherein the backup manager is further configured to:
- store one or more backup versions of the data object, including the identified at least one backup version, prior to receiving the error code; and
- in response to the error code, perform an analysis of the stored one or more backup versions to identify the at least one backup version.

20. The computer-readable medium as recited in claim 19, wherein, to perform the analysis, the backup manager is further configured to:
- determining whether a given backup version of the stored one or more backup versions differs from the live version of the data object according to one or more difference criteria;
- if the backup version does not differ from the live version of the data object according to the one or more difference criteria, determining that the given backup version is to be excluded from the subsequent restoration of the data object; and
- if the backup version differs from the live version of the data object according to the one or more difference criteria, determining that the given backup version is not to be excluded from the subsequent restoration of the data object.

21. The computer-readable medium as recited in claim 18, wherein the backup manager is further configured to:
- in response to a restore request received after the error code, identify a different backup version of the data object to be used to restore the live version of the data object, wherein the different backup version is not infected by the malicious software.

22. The computer-readable medium as recited in claim 18, wherein the data object is a file, a directory, a logical volume, an object of a object-based storage device (OBSD), or a database management system (DBMS) object.

* * * * *